United States Patent [19]
Todd

[11] Patent Number: 5,230,627
[45] Date of Patent: Jul. 27, 1993

[54] EDUCATIONAL CHECKBOOK

[75] Inventor: William J. Todd, San Antonio, Tex.

[73] Assignee: Jaycor, Inc., San Antonio, Tex.

[21] Appl. No.: 920,756

[22] Filed: Jul. 28, 1992

[51] Int. Cl.⁵ ............................................. G09B 19/18
[52] U.S. Cl. ................................... 434/109; 150/135; 150/146
[58] Field of Search ...................... 434/107, 109, 110; 150/135, 146, 132, 131

[56] References Cited

U.S. PATENT DOCUMENTS

| | | | |
|---|---|---|---|
| 168,796 | 10/1875 | Smith | 150/131 X |
| 678,616 | 7/1901 | Gregory | 434/109 |
| 2,904,899 | 9/1959 | Lloyd | 434/109 |
| 3,267,980 | 8/1966 | Bird | 150/135 |

FOREIGN PATENT DOCUMENTS 2464038  4/1981  France ................ 150/135

*Primary Examiner*—John J. Wilson
*Assistant Examiner*—Jeffrey A. Smith
*Attorney, Agent, or Firm*—Cox & Smith Incorporated

[57] ABSTRACT

An instructional, developmental and educational product and method for children comprises a book of imitation checks, a checkbook ledger, and a wallet for enclosing the checkbook and checkbook ledger. The wallet constitutes a rectangular flexible base sheet foldable across the width thereof to define a rectangular central portion, a first rectangular end flap and a second rectangular end flap, said end flaps being foldable over the central portion. A first fabric band secured to the central portion defines a first pocket for mounting the checkbook ledger, and one of the rectangular end flaps has a second fabric band secured thereto a define a second pocket for receiving the book of imitation checks. A coin purse and closure flap are formed on the first fabric band.

3 Claims, 3 Drawing Sheets

EDUCATIONAL CHECKBOOK

BACKGROUND OF THE INVENTION

1. Field of the Invention

The present invention relates to an educational and developmental checkbook case and purse combination in a wallet configuration for children. The checkbook case of the present invention provides instructional development of children in the use of checkbook.

2. Background Description

In the field of instructional developmental products for children there are a number of items that teach value, integrity, responsibility, and dexterity. A money vault bank distributed through Childcraft teaches manual dexterity in opening the vault door and thriftiness. School supply kits by Pretend get children involved in play school at home which develops positive thinking about school in the home environment. Earth Lab Science Kit (TM) teaches children about their environmental responsibilities by having them conduct experiments in a mini-ecological laboratory. Bankit (TM) by Discovery Toys is a home accounting system for children. That accounting system includes a savings payment envelope, account contract, checkbook, personalized check order forms, deposit slips, practice checks, and a multiple page Bankers Manual containing, among other things a description of banker responsibilities, how to bank, money management, allowances, and closing. The need for children's checkbook and wallet that is similar to an adult checkbook and wallet is evident by using the corollary that children's educational toys often emulate adult experiences.

Those experiences often take the form of adult day-to-day contacts, and interactions with other adults and institutions. Those contacts and interactions often have some transitional object that both adults or adults and institutions can focus upon. An example of that would be when an adult purchases gasoline for their automobile from a self service gas station. The attendant makes change from the tendered amount and places the balance into a cash register. The focal point for both adults is the cash register which the attendant uses to transact business. The adult experience is purchasing gasoline from a self service gas station. Examples of transitional objects upon which to focus are cash registers, gas stations, maps, and kitchen appliances. That list does not exhaust all of the day-to-day focal points that adults experience, but suggests a few. However, many of those suggested focal points of adult experiences are currently being produced as educational toys for children.

SUMMARY OF THE INVENTION

The present invention relates to a new educational system for children focusing on everyday commercial transactions using a checkbook case and purse combination for children, including a checkbook containing a supply of imitation checks, and a checkbook ledger. The checkbook case is preferably made from two plies of a substantially rectangular nylon fabric base sheet having a U-shaped wear resistant strip sewn around the perimeters thereof. The inner face of the inner ply has two bands of similar material transversely sewn thereto to define two pockets. The first pocket defines a means for retaining imitation checks. The second pocket defines a means for retaining a checkbook ledger. The band defining the second pocket may have material strips sewn thereto to define a coin purse, and three small pockets for photographs and/or credit cards.

The hardback portion of the imitation checkbook slides into the first pocket and is secured to the cause by the snugness of the fit. The checkbook ledger is similarly secured in the second pocket of the checkbook case by the snugness of fit of its cover page.

The checkbook case is completely transportable by a child. The area of the base sheet defining the first pocket folds onto the area defining the second pocket and then both are secured together in a wallet configuration by retention flap end portion of the base sheet that has a hook and loop fastener engagement with the outer face of the base sheet. The present invention thus provides a system for children to enjoy and experience the commercial use of a checkbook combination while in the home environment.

Further advantages of this invention will be readily apparent to those skilled in the art from the following detailed description, taken in conjunction with the annexed sheets of drawings, of a preferred embodiment of the invention.

DETAILED DESCRIPTION OF THE PREFERRED EMBODIMENTS

Figure 1:
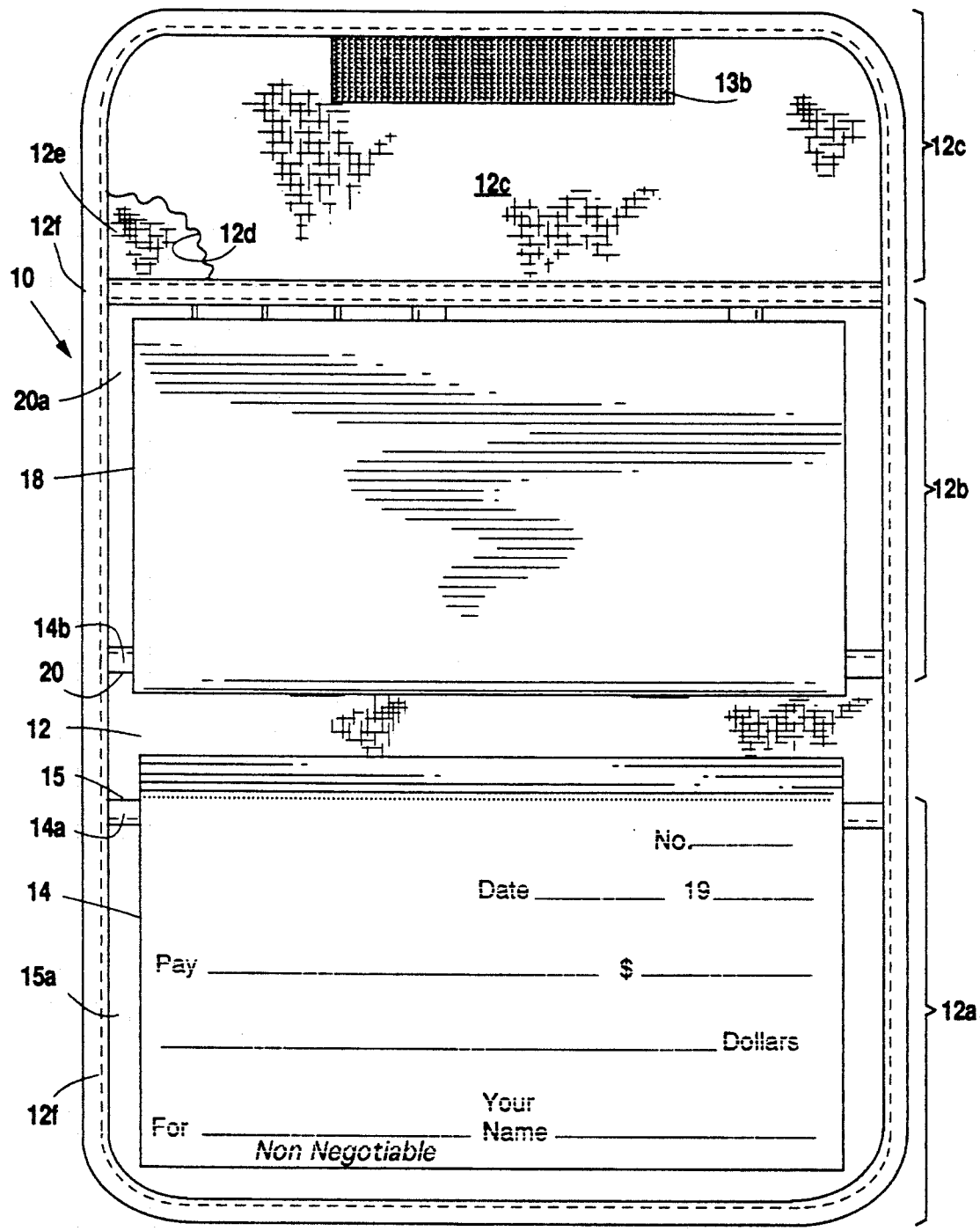
FIG. 1 is a plan view of the checkbook case in its open position.
Figure 2:
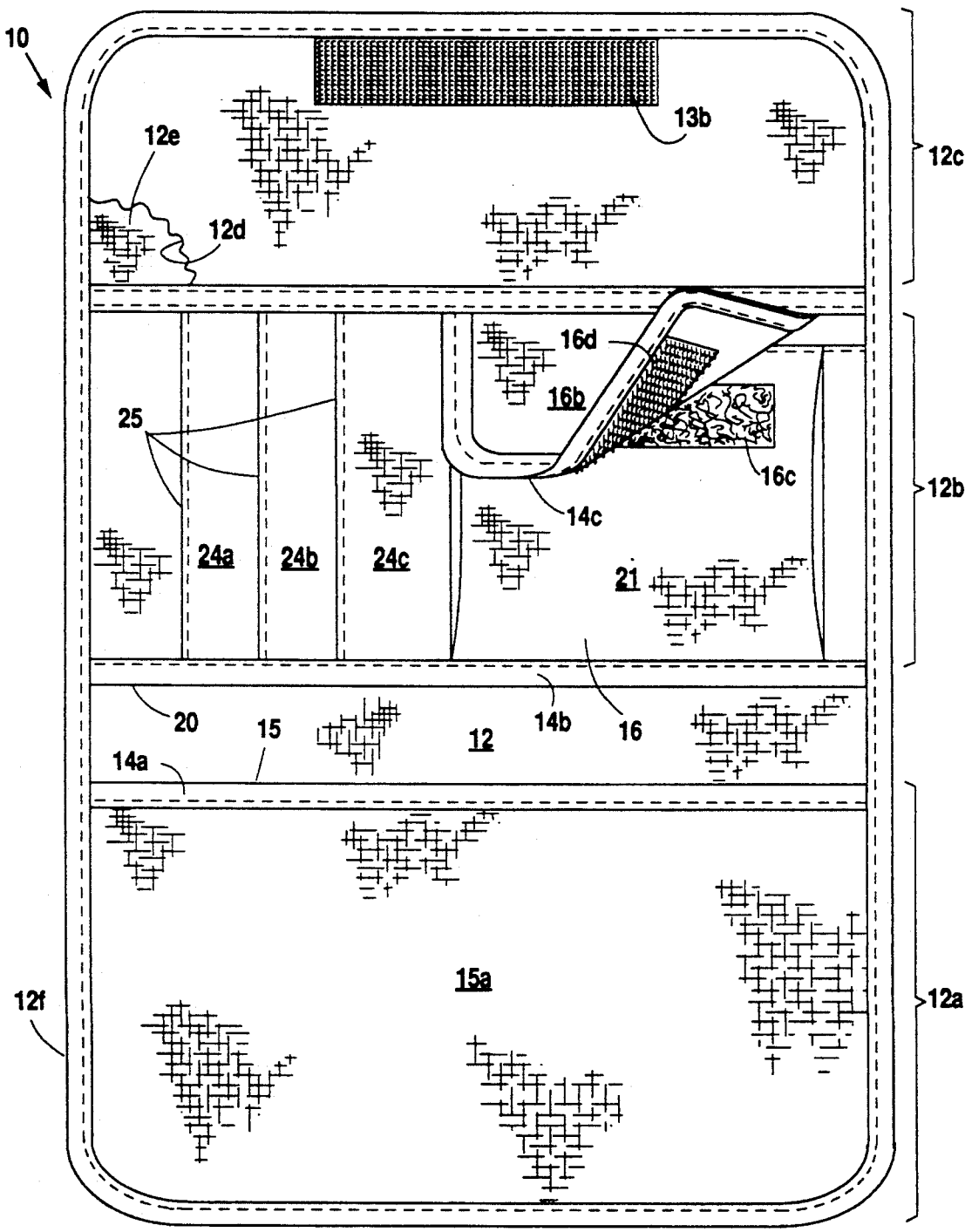
FIG. 2 is plan view of the checkbook case showing its various compartments, and with cutaway portions for clarity of illustration.

Referring to FIG. 1, an educational toy embodying this invention comprises a checkbook case 10, a book 14 of imitation personalized checks, and a check register 18. Checkbook case 10 comprises a substantially rectangular base sheet 12 foldable twice across its width to define two distinct areas 12a and 12b, and a retaining end flap 12c. If desired, base sheet 12 may be formed of two piles perimetrically joined by a stitched U-shaped cross-section border 12f, thus forming an inner ply 12d and an outer ply 12e. The interior ply portion 12d of the checkbook case 10 then defines the aforementioned areas 12a and 12b and end flap 12c. Central area 12b houses a checkbook transaction ledger 18 and 12a houses a rectangular book of imitation personalized check.

14, both supplied with the educational toy. The book of imitation personalized checks 14 is retained by a checkbook pocket 15 defined by a fabric band 15a sewn around three edges to base ply area 12a by the same threads that secure the wear strip border 12f to the plies 12d and 12e. Checkbook pocket 15 is slightly larger than the book of imitation personalized checks 14. The conventional hard back portion of the imitation personalized checkbook 14 slides into pocket 15 and is secured by the snugness of the fit.

The checkbook ledger 18 is retained in a ledger pocket 20. Ledger pocket 20 is slightly larger than the checkbook ledger 18 and is defined by a band 20a sewn on three sides to base ply area 12b. both of the band ends are secured under the peripheral wear strip 12f. One cover of the checkbook ledger 18 is slid into the ledger pocket 20 and is secured in the pocket by the snugness of the fit. If desired, wear strips 14a and 14b may be sewed to the longitudinal free edges of bands 15a and 20a.

The central fabric band 20a has an additional fabric band 21 sewn thereto defining a coin pouch 16, and individuals bands 24a, 24b and 24c sewn thereto to respectively define pockets for 3 imitation credit cards 25 or photographs. A flap 16b closes coin pouch 16 and is secured by hook and loop fastener strips 16c and 16d, such as those strips sold under the trademark VELCRO. A wear strip 14c is secured to the free edges of flap 16b.

Figure 3:
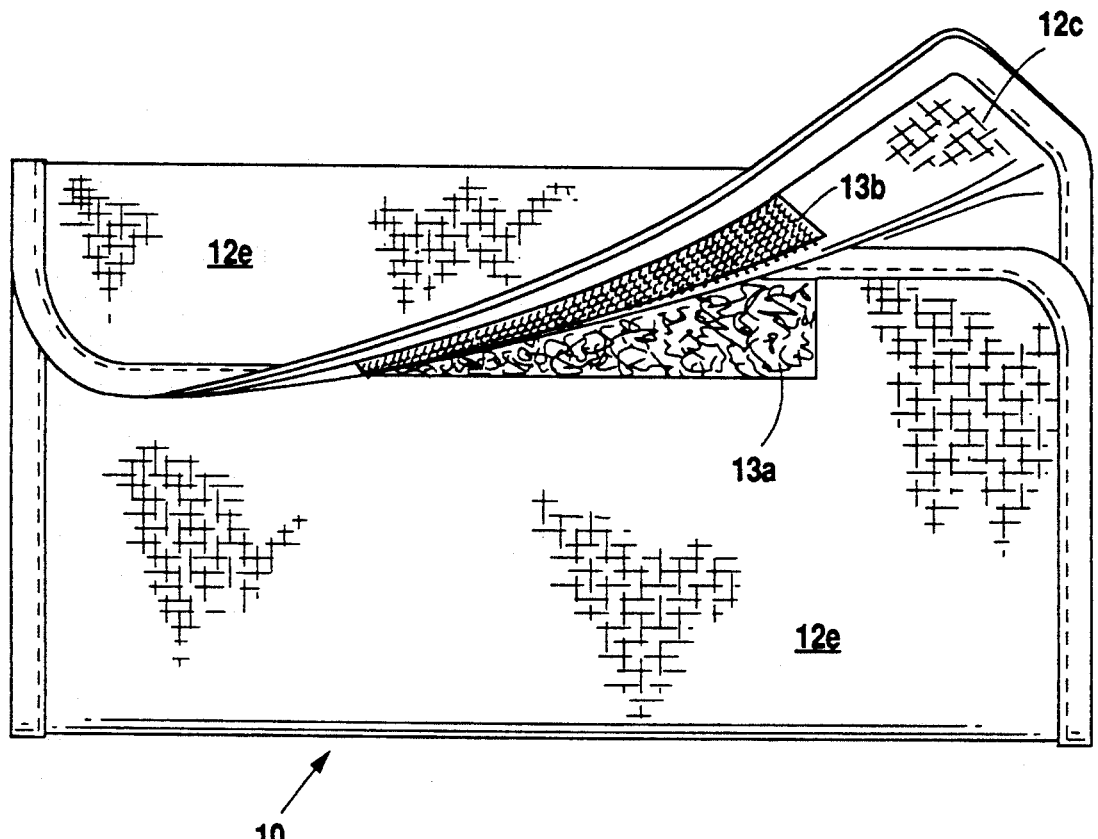
FIG. 3 is a perspective view of the check book case in its closed position.

When not is use, the band sheet 12 is folded so that check book pocket 15 overlies the transaction register pocket 20 and the end flap portion 12c is folded around the outer face of base ply 12e and secured thereto by hook and loop fastener strips 13a and 13b as shown in FIG. 3.

The preferred method of use for the checkbook case 10 by a child is to first enter a "make believe" balance in the check register. Then the child writes a check. Once a check is written it is recorded by the child in the checkbook ledger 18 and the new balance is computed.

The invention now being fully described, it will apparent to one of ordinary skill in the art that many changes and modifications can be made thereto without departing from the spirit or scope of the invention as set forth in the following claims. For example, the location of the check book and check book ledger may be conveniently interchanged.

I claim:

1. An educational toy comprising, in combination:
   rectangular book of imitation checks having a cover page;
   a rectangular checkbook ledger having a cover page;
   a substantially rectangular flexible base sheet foldable across the width thereof to define:
   (a) a rectangular central portion having dimensions slightly larger than said checkbook ledger;
   (b) a first fabric band secured to said central portion to define a first pocket for receiving a cover page of said rectangular checkbook ledger;
   (c) a first rectangular end flap having dimensions slightly larger than said book of imitation checks and foldable into overlying relation to said rectangular central portion;
   (d) a second fabric band secured to said first rectangular end flap to define a second pocket retaining means for receiving said rectangular book of imitation checks;
   (e) means on said first fabric band defining a coin purse and closure flap, whereby coins are secured inside said coin purse and
   (f) hook and loop attachment means for securing said closing flap to said purse,
   (g) a second rectangular end flap foldable over and detachably secured to first rectangular end flap when said first rectangular end flap is folded over said rectangular central portion.

2. The education toy of claim 1 further comprising fabric strips sewn onto said first fabric band to define credit card pockets.

3. The education toy of claim 1 further comprising a wear strip perimetrically sewed to said base sheet additionally securing three edges of said second fabric band and two edges of said first fabric band to said base sheet.

* * * * *